(12) United States Patent
Iwata

(10) Patent No.: US 6,539,804 B1
(45) Date of Patent: Apr. 1, 2003

(54) TWO-AXIS YAW RATE SENSOR

(75) Inventor: Hitoshi Iwata, Aichi (JP)

(73) Assignee: Kabushiki Kaisha Tokai Rika Denki Seisakusho

( * ) Notice: Subject to any disclaimer, the term of this patent is extended or adjusted under 35 U.S.C. 154(b) by 0 days.

(21) Appl. No.: 09/581,360

(22) PCT Filed: Jun. 21, 1999

(86) PCT No.: PCT/JP99/03280
§ 371 (c)(1),
(2), (4) Date: Jun. 9, 2000

(87) PCT Pub. No.: WO99/67598
PCT Pub. Date: Dec. 29, 1999

(30) Foreign Application Priority Data

Jun. 22, 1998 (JP) ............................................. 10-174787

(51) Int. Cl.⁷ .................................................. G01P 9/04
(52) U.S. Cl. .................................................... 73/504.13
(58) Field of Search ........................ 73/504.13, 504.12, 73/504.14; 310/321, 329

(56) References Cited

U.S. PATENT DOCUMENTS

| 5,226,321 A | 7/1993 | Varnham et al. ........... 73/504.13 |
| 6,089,090 A | * 7/2000 | Namerikawa et al. ... 73/504.13 |

FOREIGN PATENT DOCUMENTS

| DE | 691 02 590 T2 | 6/1994 |
| EP | 0 836 073 A2 | 4/1998 |
| FR | 2 772 469 A1 | 12/1997 |
| GB | 2 113 842 A | 1/1982 |
| GB | 2 318 184 A | 8/1996 |
| JP | 2-163611 | 6/1990 |
| JP | 02198312 A | 8/1990 |
| JP | 2-198315 | * 8/1990 |
| JP | 3-36912 | 4/1991 |
| JP | 7-91958 | 4/1995 |
| JP | 08201067 A | 8/1996 |
| JP | 8-247769 | 9/1996 |
| JP | 08271258 A | 10/1996 |
| JP | 8-271258 | 10/1996 |
| JP | 9-166446 | 6/1997 |
| JP | 9-189553 | 7/1997 |
| WO | WO 98/17973 | 4/1998 |

* cited by examiner

Primary Examiner—John E. Chapman
(74) Attorney, Agent, or Firm—Robert D. Buyan; Stout, Uxa, Buyan & Mullins, LLP

(57) ABSTRACT

A two-axis yaw rate sensor (1) includes a vibration ring (15) and a ring support plate for supporting the vibration ring (15). The vibration ring (15) includes first to fourth vibrating drive surfaces (16a–16d) arranged in turn in a circumferential direction and narrow portions (17) located between the adjacent drive surfaces (16a–16d). The first and the third drive surfaces (16a, 16c) are opposed to one another on the axis Y passing through the center of the vibration ring (15). The second and the fourth drive surfaces (16b, 16d) are opposed to one another on the axis X passing through the center of the vibration ring (15). The axis Y is substantially perpendicular to the axis X. A PZT film (15) is formed on the drive surfaces (16a–16d) and vibrates the drive surfaces (16a–16d) in a radial direction of the vibrating ring (15). A weight (21) is coupled to a coupling portion (22) of each drive surface (16a–16d) and vibrates in a direction substantially perpendicular to the vibrating direction of the vibrating surfaces (16a–16d). Detection electrode films (24a–24d) are formed on the coupling portions (22) and detect the deformation of the corresponding coupling portions (22).

6 Claims, 8 Drawing Sheets

Fig.5
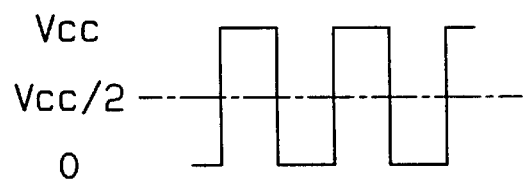
Fig.6(a)   Fig.6(b)   Fig.6(c)
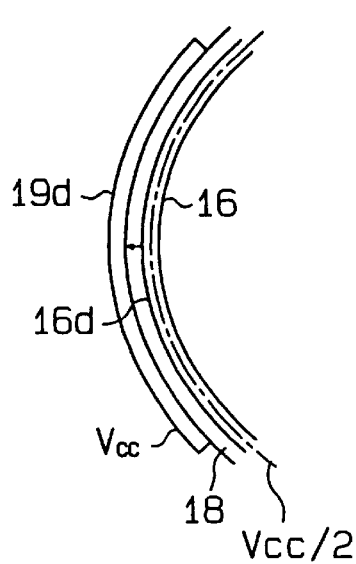 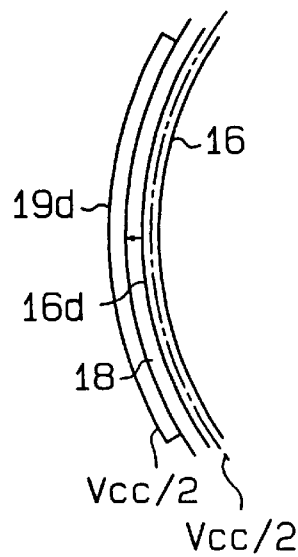 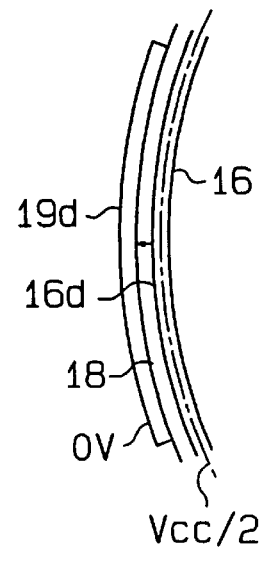

TWO-AXIS YAW RATE SENSOR

BACKGROUND OF THE INVENTION

The present invention relates to a yaw rate sensor, and more specifically, a yaw rate sensor that detects the yaw rate of two perpendicular axes and a method for manufacturing the sensor.

Tuning fork or vibration ring type sensors are conventionally known as yaw rate sensors. The tuning fork or the vibration ring type yaw rate sensors are made of many parts. The yaw rate sensors detect the angular velocity and the rotation direction around one axis.

There is a need for a two-axis yaw rate sensor that simultaneously detects the angular velocities and rotation directions of X and Y axes, which cross one another at a right angle. However, combining two sensors, each of which detects the angular velocity and the rotation of one axis, complicates the structure of the yaw rate sensor. This increases the number of parts and the manufacturing costs of the yaw rate sensor.

SUMMARY OF THE INVENTION

An objective of the present invention is to provide a simple two-axis yaw rate sensor and its manufacturing method.

To achieve the above objective, a two-axis yaw rate sensor according to the present invention includes: a ring-shaped member (15); wherein the ring-shaped member (15) includes first to fourth vibrating drive surfaces (16a–16d) located in turn in a circumferential direction and support parts (17) located between the adjacent drive surfaces (16a–1c), wherein the first and the third drive surfaces (16a, 16c) are opposed to one another on a first axis passing through the center of the ring-shaped member (15), the second and the fourth drive surfaces (16b, 16d) are substantially perpendicular to the first axis and oppose one another on a second axis passing through the center of the ring-shaped member (15); a support member (11) for supporting the ring-shaped member (15) at each support part (17); a piezoelectric member (18), which is located on each drive surface (16a–16d) and vibrates the corresponding drive surface (16a–16d) in a radial direction of the ring-shaped member (15); a coupling portion (22) extending from each drive surface (16a–16d); a weight (21), which is coupled to each coupling portion (22) and swings in a direction substantially perpendicular to the vibrating direction of the drive surfaces (16a–16d); and a deformation detection member (24a–24d) formed on each coupling portion (22) for detecting the deformation of the corresponding coupling portion (22).

A method for manufacturing a yaw rate sensor of the present invention includes: forming a ring-shaped member (15) by punching a flat metal plate, a weight integrally coupled to the ring-shaped member (15), and a coupling portion (22) coupling the ring-shaped member (15) to the weight (21); bending the ring shaped member (15) to be cylindrical; bending the coupling portion (22) such that the weight (21) extends perpendicular to the peripheral or inner surface of the ring-shaped member (15); forming a titanium film on the inner and peripheral surfaces and on the coupling portion (22) of the weight (21); forming a piezoelectric film (18) on the titanium film; and forming an electrode (19a–19d, 24a, 24d) on the piezoelectric film (18) corresponding to the ring-shaped member (15) and on the piezoelectric film (18) of the coupling portion (22).

BRIEF DESCRIPTION OF THE DRAWINGS

FIG. 5 is a waveform of driver signals supplied to the yaw rate sensor of FIG. 1.

FIGS. 6(a)–6(c) are partial enlarged views illustrating the states of the yaw rate sensor of FIG. 1.

DETAILED DESCRIPTION OF THE INVENTION

A yaw rate sensor according to one embodiment of the present invention will now be described with reference to FIGS. 1–4, 6, and 7.

Figure 1:
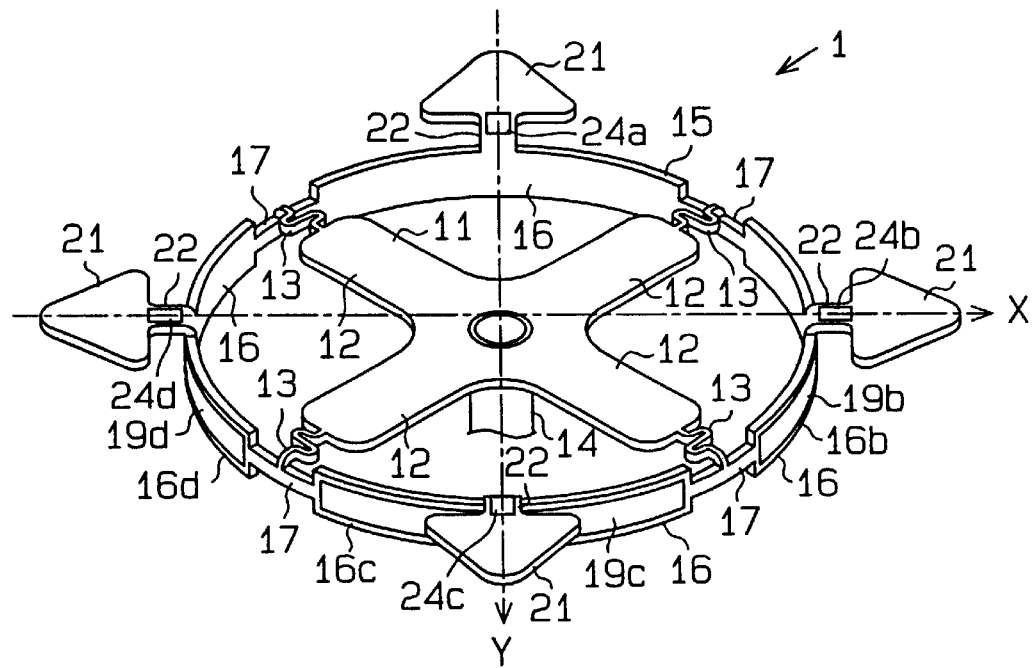
FIG. 1 is a perspective view of a two-axis yaw rate sensor according to a first embodiment of the present invention.
Figure 2:
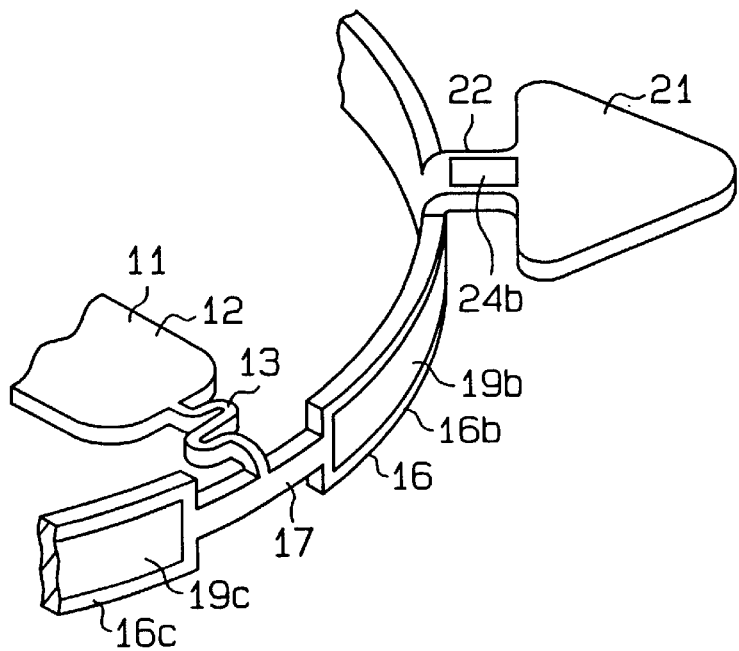
FIG. 2 is a partial enlarged view of the yaw rate sensor of FIG. 1.

As shown in FIG. 1, a yaw rate sensor 1 includes a ring support plate 11, a vibration ring 15 supported by the ring support plate 11, and four masses 21 extending radially from the vibration ring 15.

The ring support plate 11, the vibration ring 15, and the masses 21 are formed as one body which is preferably made of a stainless steel having a thickness less than about 0.5 mm. The ring support plate 11 is coupled to the vibration ring 15 by first couplers 13, and the masses 21 are coupled to the vibration ring 15 by second couplers 22.

Alternatively, the ring support plate 11 may be independent and may be connected to the vibration ring 15 and the masses 21 by connecting means such as adhesives, solder, and brazing. The vibration ring 15 may be made of metals other than stainless steel. If the vibration ring 15 is made of titanium, it is unnecessary to form a titanium film mentioned below. The shape of the vibration ring 15 may be rectangular.

The ring support plate 11 is substantially cross-shaped and includes four support arms 12 extending along the X, Y, axes which cross at a right angle. A fixed post 14 is attached to a central lower surface of the ring support plate 11. The vibration ring 15 is shaped like a low-height cylinder and includes four vibrating portions 16 and narrow portions 17 connecting the adjacent vibrating portions. As shown by the enlarged view of FIG. 2, the width of the narrow portions 17 is smaller than that of the vibrating portions 16. The vibration ring 15 is integrally coupled to and supported by the ring support plate 11 through first coupling portions 13 on the narrow portions 17. The first coupling portions 13 are wave-shaped and elastic. Therefore, the vibrating portions 16 of the vibration ring 15 vibrate at their connection points with the coupling portions 13. Instead of arranging the ring support plate 11 inside the vibration ring 15, a plurality of supports may be arranged outside the vibration ring 15, supporting the vibration ring 15.

As shown in FIG. 1, the outer surface of the vibrating portion 16 forms four drive surfaces 16a–16d. A first drive surface 16a faces in a direction opposite to the direction Y of the axis Y, a second drive surface 16b faces in the direction X of the axis X, a third drive surface 16c faces in the direction Y of the axis Y, and a fourth drive surface 16d faces in a direction opposite to the direction X of the axis X (see FIG. 3, masses 21 are omitted for ease of the illustration). The drive surfaces 16a–16d may be the inner surface of the vibrating ring 15. In this case, the masses 21 may extend toward the center of the vibrating ring 15.

Figure 7:
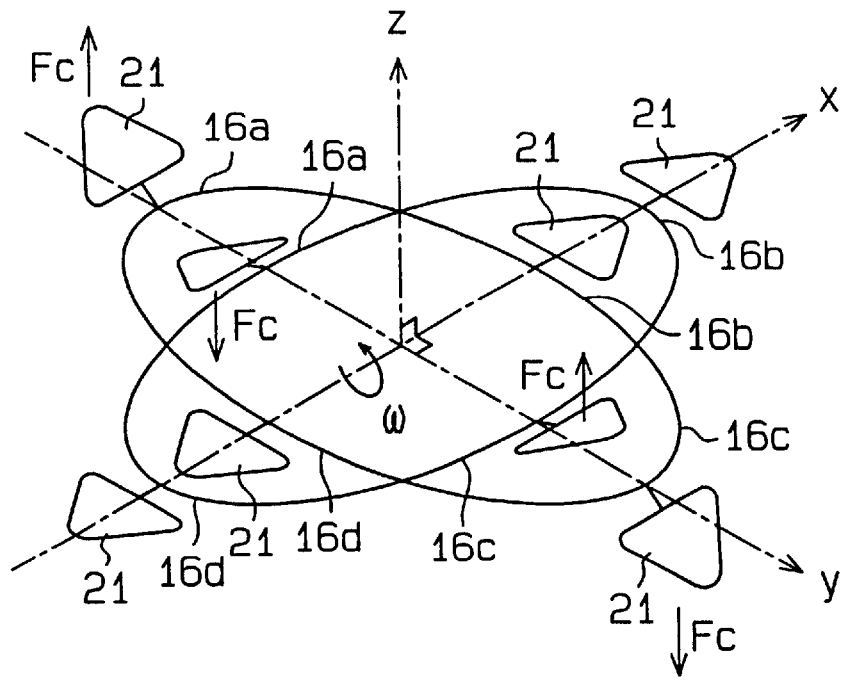
FIG. 7 is a diagrammatic view illustrating the movement of the mass of the yaw rate sensor of FIG. 1.

FIG. 7 illustrates the movement of the yaw rate sensor 1 and the drive surfaces 16a–16c when they are vibrating. The first and the third drive surfaces 16a, 16c are located 180-degrees from one another about an axis Z (the axis of the fixed post 14) perpendicular to the axes X, Y. The second and the fourth drive surfaces 16b, 16d are located 180-degrees from one another about the axis Z.

A titanium film is formed by sputtering on the entire surfaces of the vibration ring 15, the ring support plate 11, the masses 21, the first coupling portions 13, and the second coupling portions 22. The titanium film forms a base layer. A PZT (lead (Pb) Zirconate Titanate) film 18 (see FIG. 3) having preferably tens of μm is formed on the entire surface of the titanium film. The PZT film 18 forms a ferroelectric film (piezoelectric film). Instead of the PZT film 18, other piezoelectric materials may be used for forming a piezoelectric film. A deformation sensor made of bulk piezoelectric material or piezoresistance element may be formed.

Figure 3:
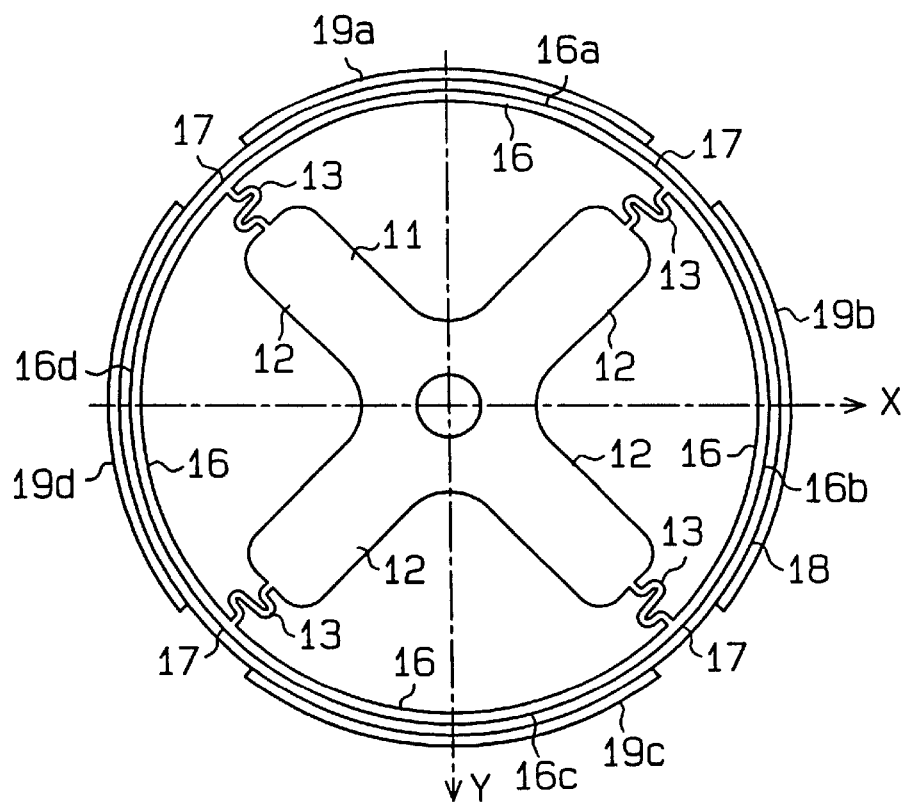
FIG. 3 is a plan view of the vibration ring of the yaw rate sensor of FIG. 1.

As shown in FIG. 3, first to fourth drive electrode films 19a–19d are formed on the PZT film 18 corresponding to the first drive surface 16a to the fourth drive surface 16d. The first to the fourth drive electrode films 19a–19d have equal areas. Each drive electrode film 19a–19d is made of aluminum and is a few μm thick. The electrode films 19a–19d may be made of other conductive metals such as Au (gold). In FIG. 3, the thickness of the PZT film 18 and the electrode films 19a–19d are enlarged for the convenience of illustration.

As shown in FIG. 1, each mass 21 extends radially from the center top of each vibrating portion 16 through the corresponding second coupling portions 22. Each mass 21 is substantially triangular and has a plane perpendicular to the axis Z. Also, each mass 2a has substantially equal weight. The masses 21 may be located at the lower portion of the vibrating portion 16 or may extend inwardly from the vibration ring 15.

The width of the second coupling portions 22 is less than that of the proximal part of the masses 21. Also, the second coupling portions 22 are elastic. First to fourth detection electrode films (deformation detecting members) 24a–24d are formed on the PZT film 18 on the second coupling portions 22. Each of the detection electrode films 24a–24d has the same area and is made of aluminum a few μm thick. The first detection electrode film 24a faces in a direction opposite the direction Y of the axis Y, the second detection electrode film 24b faces in the direction X of the axis X, the third detection electrode film 24c faces in the direction Y of the axis Y, and the fourth detection electrode film 24d faces in a direction opposite the direction X of the axis X.

A method for manufacturing the yaw rate sensor 1 will now be described with reference to FIGS. 9 and 10.

Figure 9:
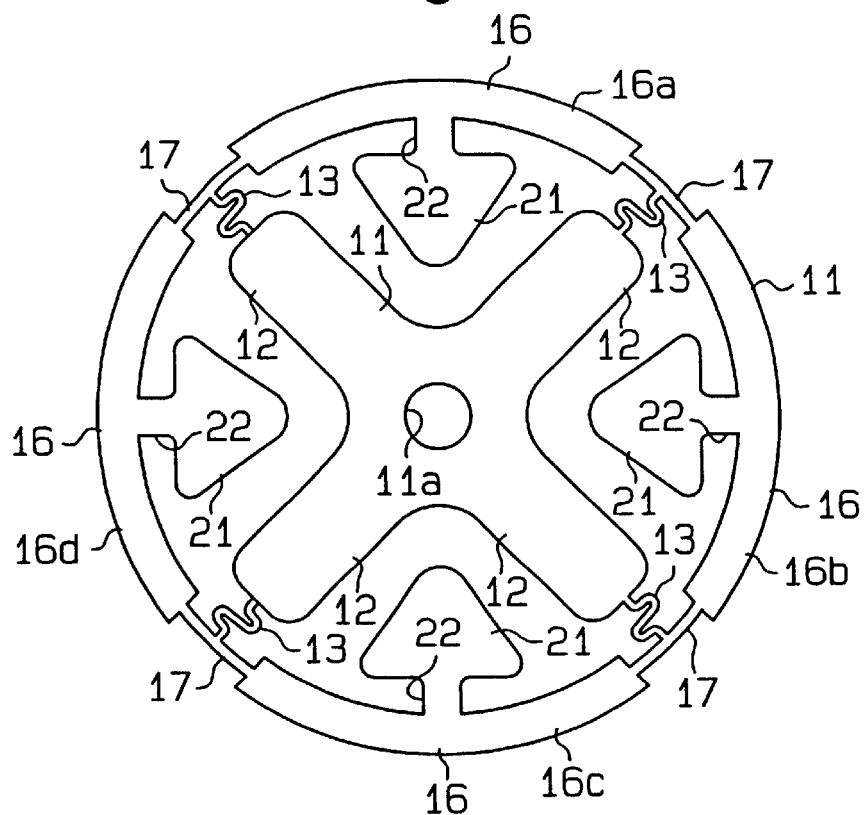
FIG. 9 is a plan view of a base plate blank.

First, a stainless steel plate having less than 0.5 mm thickness is punched as shown in FIG. 9. The punching forms the ring support plate 11 having the support arms 12. Further, the vibration ring 15 connected to the first coupling portion 13 is formed. A through hole 11a is formed in the center of the ring support plate 11.

The vibrating portions 16 of the vibration ring 15 are formed about the vibration ring 15 in four directions, and the drive surfaces 16a–16d of the vibrating portions 16 are formed on the visible side of the vibrating portion 16 in FIG. 9. The masses 21 extend toward the ring support plate 11 through the second coupling portions 22.

Next, the entire surface of the base plate of FIG. 9 is cleaned, and the titanium film is formed on the surface by a physical film formation method such as sputtering or vapor deposition.

Figure 10:
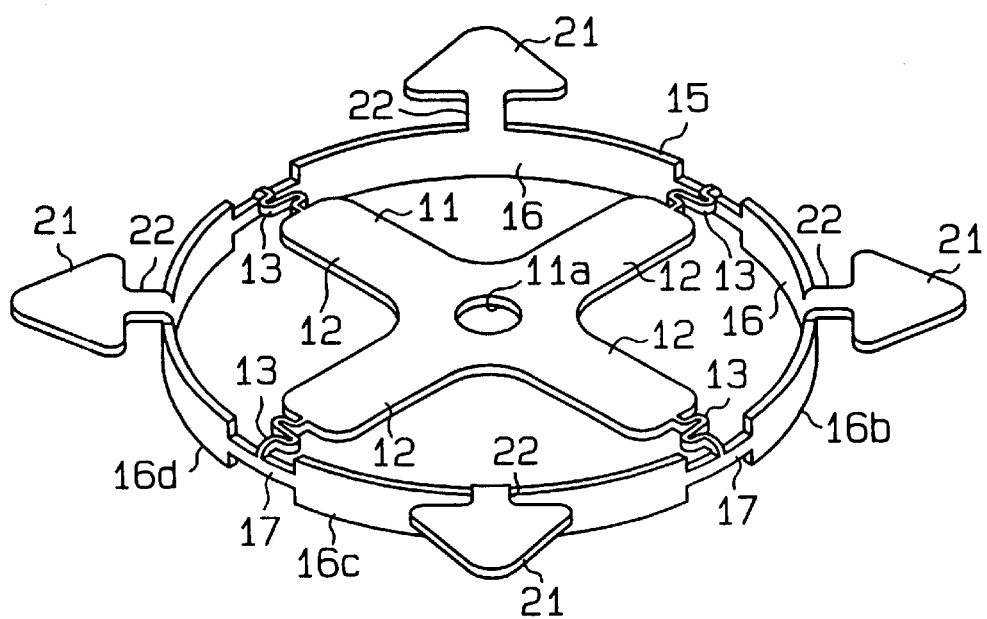
FIG. 10 is a perspective view of the base plate blank of FIG. 9 on which drive bending work has been performed.

Then, as shown in FIG. 10, the vibration ring 15 is bent 90-degrees relative to the first coupling portions 13 of the ring support plate 11. Further, the second coupling portions 22 are bent 90-degrees outward relative to the vibration ring 15, so that the masses 21 extend radially about the through hole 11a. These processes cause the drive surfaces 16a–16d to be located on the radially outer surfaces of the vibrating portions 16.

Next, the PZT film 18 is formed on the titanium film by a water-heat method. The water-heat method includes two steps.

First Step

An aqueous solution of zirconium oxychloride ($ZrOCl_2 \cdot 8H_2O$) and lead nitrate ($Pb(NO_3)_2$) and a solution of KOH(8N) is mixed in a tetrafluoroethylene container (not shown). The proportions of lead titanate and lead zirconate in the PZT film 18 determine the piezoelectric property of the PZT film 18. Therefore, the mole-ratio between zirconium oxychloride and lead nitrate is determined in accordance with the piezoelectric property of the PZT film 18.

Next, the base plate is arranged at the upper portion of the container (not shown), the aqueous solution of zirconium oxychloride ($ZrOCl_2 \cdot 8H_2O$) and the lead nitrate ($Pb(NO_3)_2$) and a solution of KOH(8N) are mixed. The mixed solution is heated and pressurized while being stirred at a speed of 300 rpm. The mixed solution is pressurized by evaporation of the heated solution. This process continues for 48 hours at 150 degrees Celsius. As a result, seed crystals (crystal nuclei) of the PZT are formed on the titanium film of the base plate in supersaturation. Then, the base plate is taken out of the pressurized container, washed with water, and dried.

Second Step

Next, the base plate having the seed crystals, an aqueous solution of zirconium oxychloride ($ZrOCl_2 \cdot 8H_2O$) and lead nitrate ($Pb(NO_3)_2$), and a solution of titanium tetrachloride ($TiCl_4$) and KOH (4N) are stirred in a tetrafluoroethylene container (not shown). The piezoelectric property of the PZT film 18 is determined by the proportions of lead titanate and lead zirconate. Accordingly, the mole-ratio of zirconium oxychloride, titanium tetrachloride, and lead nitrate is determined in accordance with the piezoelectric property of the PZT.

Next, the base plate is arranged at the upper portion of the container (not shown), the aqueous solution of zirconium oxychloride ($ZrOCl_2 \cdot 8H_2O$) and the lead nitrate ($Pb(NO_3)_2$), the titanium tetrachloride ($TiCl_4$), and a solution of KOH (4N) are mixed. The mixed solution is heated and pressurized while being stirred at a speed of 300 rpm. The mixed solution is pressurized by the evaporation of the heated solution. This process continues for 48 hours at 120 degrees Celsius. As a result, the PZT film 18 is formed on the entire surface of the base plate in supersaturation. The PZT film preferably has a thickness of tens of a few $\mu$m. Then, the base plate is taken out of the pressurized container, washed with water, and dried.

Then, aluminum is formed with a physical film formation method such as sputtering or vacuum evaporation on the PZT film 18 on the first to fourth drive surfaces 16a–16d of the vibrating portions 16 and on the second coupling portions 22. Then, the aluminum is patterned by removing any unnecessary parts. This forms the first to fourth drive electrode films 19a–19d and the first to fourth detection electrode films 24a–24d, and thus, the yaw rate sensor 1. When using the yaw rate sensor 1, the fixed post 14 is attached to the through hole 11a of the ring support plate 11 by crimping. The drive electrode films 19a–19d may also be formed by spraying or by masking of conductive paste (for example, Ag epoxy). The conductive paste may be printed by a screen printing method.

A yaw rate sensor device 41 employing the yaw rate sensor 1 will now be described with reference to FIGS. 11 and 12.

Figure 11:
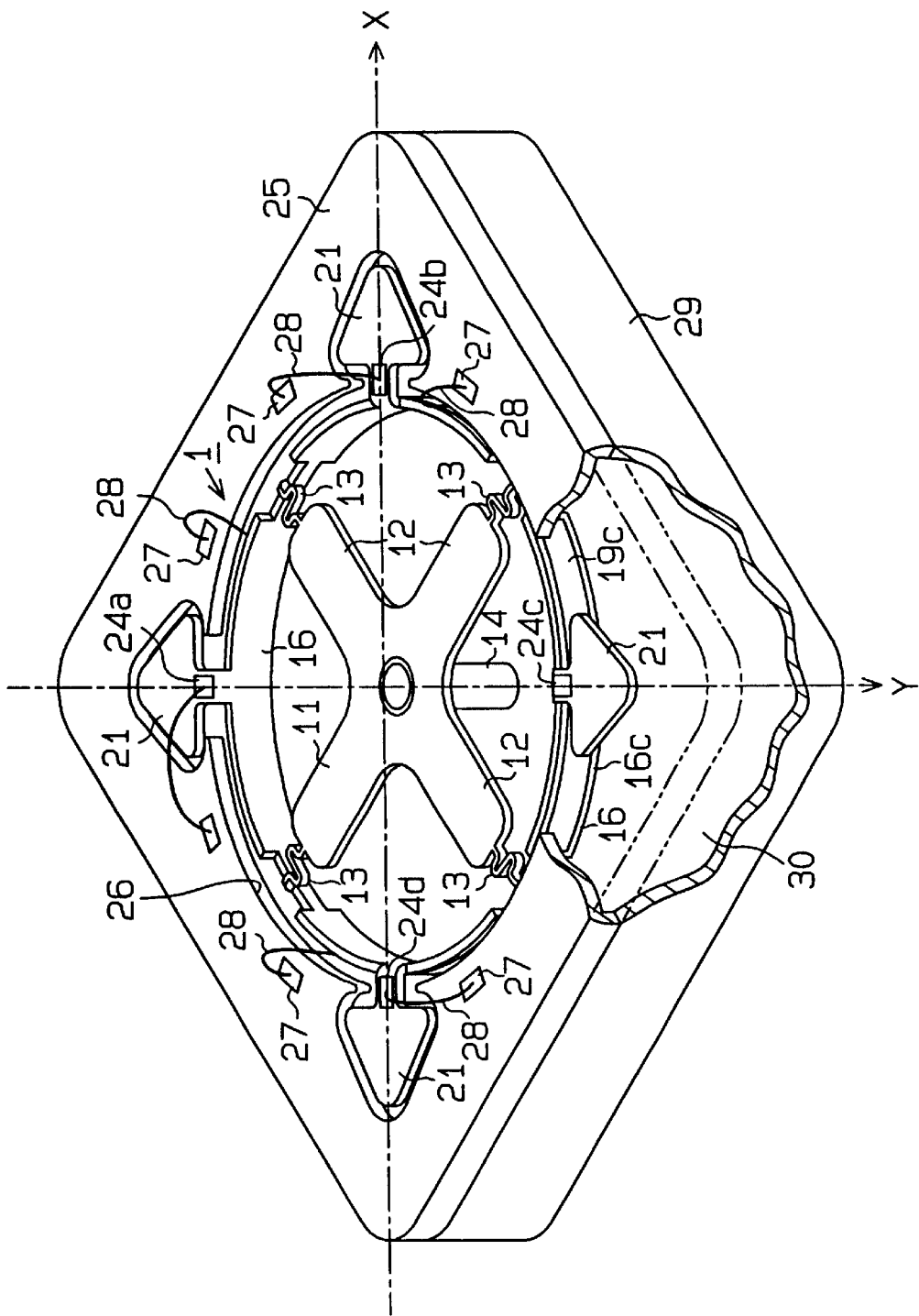
FIG. 11 is a perspective view of a two-axis yaw rate sensor device including the yaw rate sensor of FIG. 1.
Figure 12:
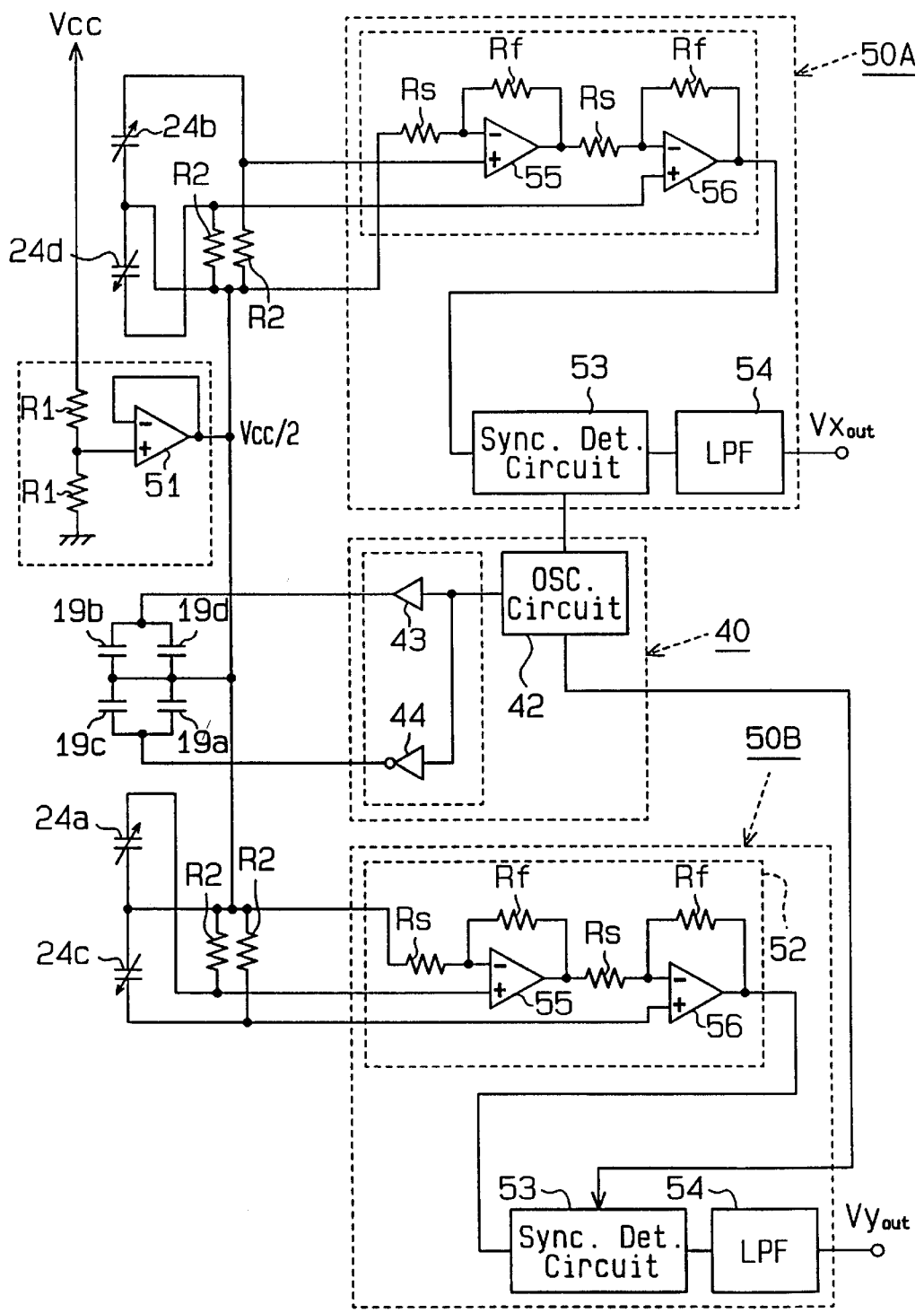
FIG. 12 is a schematic diagram of an electrical circuit of the two-axis yaw rate sensor device of FIG. 11.

As shown in FIG. 11, the yaw rate sensor device 41 includes the yaw rate sensor 1, a circuit substrate 25, and a stay case 29. The stay case 29 is box-shaped with an opening and includes an accommodation recess 30. The fixed post 14 for supporting the yaw rate sensor 1 is located at the center of the bottom surface of the accommodation recess 30. The circuit substrate 25 is fixed to a side wall of the stay case 29 to cover the opening of the stay case 29. An accommodation hole 26 for accommodating the yaw rate sensor 1 is formed at the center of the circuit substrate 25. The accommodation hole 26 is large enough to permit the vibration of the vibration ring 15 of the yaw rate sensor 1.

Connection wires 28 are soldered between the pads of electrode films 19a–19d, 24a–24d and connection pads 27 (input/output terminals) of the circuit substrate 25.

An electrical circuit of the substrate 25 will now be described with reference to FIG. 12.

The yaw rate sensor device 41 includes a signal generation circuit 40 and detection circuits 50A, 50B.

The signal generation circuit 40 includes an oscillation circuit 42, an inverter 44, and an amplification circuit 43. The oscillation circuit 42 oscillates a voltage signal having a predetermined frequency (see FIG. 5) and supplies the oscillating signal to the amplification circuit 43 and the inverter 44. The amplification circuit 43 supplies the signal from the signal generation circuit 40 to the second and the fourth drive electrode films 19b, 19d as a first driver signal. The inverter 44 inverts the signal from the oscillation circuit 42 with respect to a standard potential (Vcc/2) and supplies the inverted signal to the first and the third drive electrode films 19a, 19c as a second driver signal. The first and second driver signals are alternate signals having frequencies related to the resonance of the yaw rate sensor 1. A pair of resistors R1 are serially connected between a power source Vcc and a ground line. The positive terminal of the resistor R1 on the ground side is connected to a non-inverting input terminal of an operational amplifier 51, which forms a voltage follower. The output terminal of the voltage follower 51 is connected to the base plate of the yaw rate sensor 1. That is, the potential on the base plate side is a standard potential VA (2.5V=Vcc/2, in the present embodiment).

The structure of the detection circuit 50A will now be described. The detection circuit 50A includes a sensor signal amplification circuit 52, a synchronous detection circuit 53, and a low-pass filter circuit 54.

The sensor signal amplification circuit 52 includes a first operational amplifier 55, a second operational amplifier 56, a resistor RS, and two negative feedback resistors Rf.

The second detection electrode film 24b has a terminal connected to the non-inverting input terminal of the first operational amplifier 55. The first operational amplifier 55 amplifies the piezoelectric voltage signal (deformation signal) from the second detection electrode film 24b at an amplification degree (amplification ratio) determined by the resistor Rs and the negative feedback resistor Rf. The amplified piezoelectric voltage signal is sent to the inverting input terminal of the second operational amplifier 56 through the resistor Rs. The non-inverting input terminal of the first operational amplifier 55 is connected to the output terminal of the voltage follower 51 through a resistor R2.

The fourth detection electrode film 24d includes a terminal connected to the non-inverting input terminal of the second operational amplifier 56. The second operational amplifier 56 amplifies the piezoelectric voltage signal (deformation signal) from the fourth detection electrode film 24d at an amplification degree (amplification ratio) determined by the resistor Rs and the negative feedback resistor Rf. The amplified piezoelectric voltage signal is sent to the synchronous detection circuit 53. The non-inverting input terminal of the second operational amplifier 56 is also connected to the output terminal of the voltage follower 51 through the resistor R2.

The synchronous detection circuit 53 detects the piezoelectric signal from the sensor signal amplification circuit 52 based on the detection signal from the oscillation circuit 42 and detects the rotation direction about the axis X. That is, the synchronous detection circuit 53 outputs either a voltage signal greater than the standard potential (Vcc/2 in the present invention) or a voltage signal smaller than the standard potential in accordance with the rotation direction of the angular velocity about the axis X. The rotation direction of the angular velocity about the axis X is detected by comparing the standard potential and the level of the voltage signal from the synchronous detection circuit 53.

The output terminal of the second operational amplifier 56 is connected to the low-pass filter circuit 54 through the synchronous detection circuit 53. The output terminal of the low-pass filter circuit 54 is connected to a terminal Vxout. The low-pass filter circuit 54 filters and smoothes a predetermined frequency from the piezoelectric voltage signal from the synchronous detection circuit 53 and outputs a signal in accordance with the level of the angular velocity about the axis X applied to the yaw rate sensor 1. The level of the output is proportional to the level of the angular velocity, and the level of the angular velocity is detected by the level of the output.

The detection circuit 50B detects the level of the angular velocity about the axis Y and the rotation direction. The structure of the detection circuit 50B is similar to that of the detection circuit 50A, and therefore the description is omitted.

The low-pass filter circuit 54 of the detection circuit 50B receives a piezoelectric voltage signal based on the piezoelectric voltage signal (deformation signal) from the first and the third detection electrodes 24a, 24c. Then, the low-pass filter circuit 54 filters and smoothes a predetermined frequency out of the piezoelectric voltage signal and outputs from a terminal Vyout a signal in accordance with the level of angular velocity about the axis Y applied to the yaw rate sensor 1.

The operation of the yaw rate sensor device 41 will now be described.

First, the first driver signal is synchronously applied to the second and the fourth drive electrode films 19b, 19d through the amplification circuit 43 of the signal generation circuit 40. And, the second driver signal is synchronously applied to the first and the third drive electrode films 19a, 19c through the inverter 44 of the signal generation circuit 40.

FIGS. 6(a)–6(c) illustrate the vibrating state of the fourth drive surface 16d of the vibrating portion 16. The polarization direction of the PZT film 18 is a direction toward the drive electrode film 24a from the base plate as shown by the arrow. In the figures, the vibrating portion 16 has the standard voltage Vcc/2.

As shown in FIG. 6(a), when a potential greater than the standard potential (Vcc/2) is applied to the PZT film 18 by the first (or second) drive signal, the PZT film 18 is extended outward. In contrast, as shown in FIG. 6(c), when a potential smaller than the standard potential (Vcc/2) is applied to the PZT film 18, the PZT film 18 contracts inward. FIG. 6(b) shows the case in which a voltage that has the same potential as the vibration ring 15 (base plate) is applied to the PZT film 18. The vibrating portion 16 is located in the middle position between FIGS. 6(a) and 6(c).

In this way, the first and the third drive surfaces 16a, 16c of the vibrating portion 16 are synchronized and vibrate in opposite directions along the axis Y by the change of the potential of the second driver signal relative to the standard potential (Vcc/2). Likewise, as the potential across the standard potential (Vcc/2) of the driver signal changes, the second and the fourth drive surfaces 16b, 16d of the vibrating portion 16 are synchronized and vibrate in the opposite directions along the axis X. That is, the drive surfaces 16a–16d vibrate alternately in a radial direction or toward the center.

Figure 4:
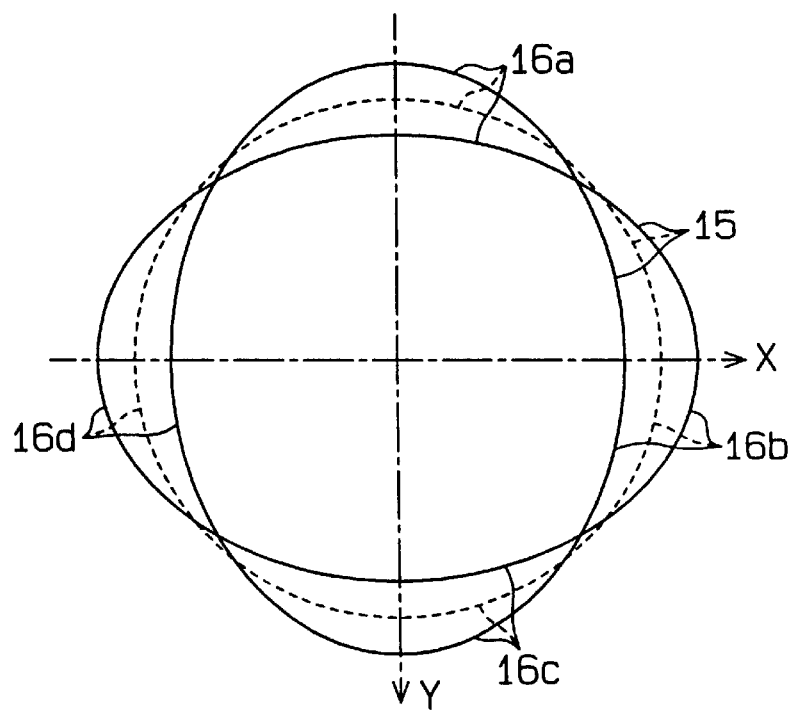
FIG. 4 is a diagrammatic view illustrating the vibration of the vibration ring of FIG. 3.

The second driver signal applied to the first and the third drive surfaces 16a, 16c is inverted with respect to the standard potential (Vcc/2) from the first driver signal applied to the second and the fourth drive surfaces 16b, 16d. Therefore, as shown in FIG. 4, the vibration ring 15 vibrates, which increases and decreases the diameter in the direction of the axis X. The vibration causes the masses 21 of the vibrating portions 16 to vibrate in the same direction as the drive surfaces 16a–16d.

Figure 8:
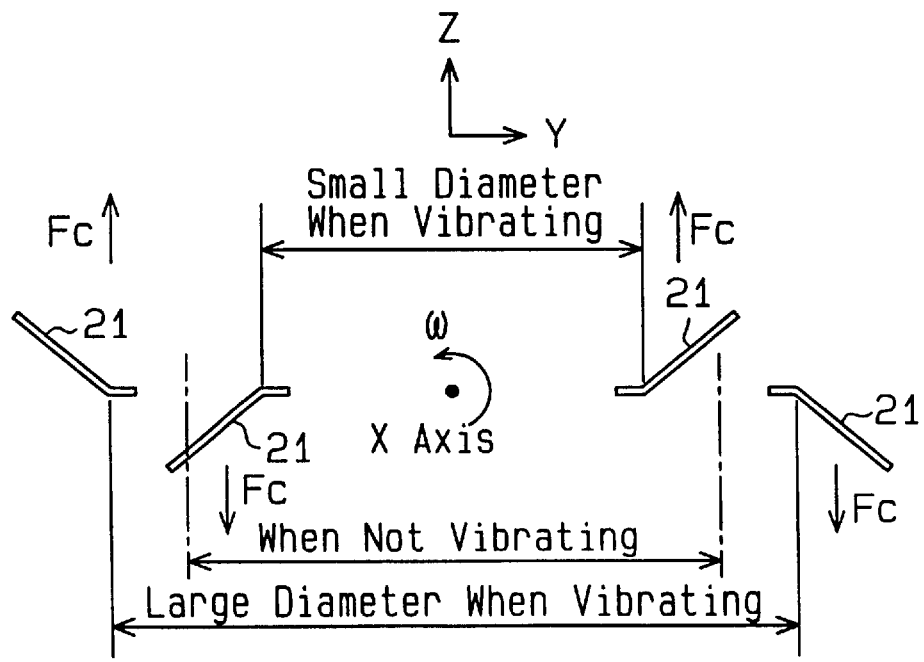
FIG. 8 is a side view illustrating the motion of the mass of FIG. 7.
Figure 13:
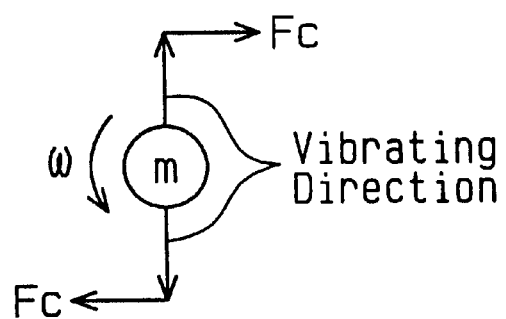
FIG. 13 is a diagrammatic view of a Coriolis force produced in accordance with the vibration direction and the angular velocity of the yaw rate sensor.

As shown in FIGS. 7 and 8, when an angular velocity ω about the axis X is generated in the yaw rate sensor 1, the masses 21 arranged in the direction of the axis Y receive a Coriolis force Fc in the direction of the axis Z and bend at the second coupling portions 22. In detail, when the vibration ring 15 extends in the direction of the axis Y, the mass 21 on the side of the first driving surface 16a bends in the direction of the axis Z. When the vibration ring 15 contracts in the direction of the axis Y, the second coupling portions 22 bend in the direction opposite to the direction of the axis Z. At this time, the amplitude (bending amount) of the masses 21 is proportional to the Coriolis force Fc. As shown in FIG. 13, the direction of the Coriolis force Fc is determined by the vibrating direction of an object and the angular velocity ω applied to the object. In FIG. 8, the left mass 21 corresponds to the first drive surface 16a, and the right mass 21 correspond to the third drive surface 16c. The mass 21 of the third drive surface 16c bends in a direction opposite to the mass 21 of the first drive surface 16a. At this time, the masses 21 of the second and the fourth drive surfaces 16b, 16d do not bend unless an acceleration about the axis Y is applied to the yaw rate sensor 1.

The rotation direction and the angular velocity of the force applied to the yaw rate sensor 1 are obtained by the vibrating direction (phase) and the amplitude of the masses 21 with the reference vibration of the vibration ring 15.

Also, when the rotation with the angular velocity ω about the axis Y is added to the yaw rate sensor 1, the rotation direction and the angular velocity of the force applied to the yaw rate sensor 1 are obtained by the vibrating direction (phase) and the amplitude of the masses 21 with the reference vibration of the vibration ring 15.

In the yaw rate sensor device 41, the first to fourth detection electrode films 24a–24d are located in the parts at which the second coupling portions 22 of the masses 21 extend and contract. Accordingly, the detection electrode films 24a–24d provide piezoelectric voltage signals, which are generated in the PZT film 18, to the sensor signal amplification circuits 52 of the detection circuits 50A, 50B. The sensor signal amplification circuits 52 amplify and send the piezoelectric voltage signals (deformation signals) of the first to fourth detection electrode films 24a–24d to the synchronous detection circuits 53.

Then, the synchronous detection circuits 53 detect the rotation direction of the angular velocity applied to the yaw rate sensor 1 based on the detection signal from the oscillation circuit 42 and the piezoelectric signals from the sensor signal amplification circuits 52. A predetermined frequency of the synchronous detection signals is filtered and smoothed by the low-pass filter circuits 54 and used to detect the level of the angular velocity.

As illustrated, the level and the rotation direction of the angular velocity about the axes X, Y are detected when the vibration ring 15 vibrates such that the first and the third drive surfaces 16a, 16c and the second and the fourth drive surfaces 16b, 16d vibrate in different directions.

According to the present invention, in the masses 21 on the axes X, Y, the level of the difference of the signals between the detection electrode films 24a, 24c or between the detection electrode films 24b, 24d is twice as great as that of the output signals. Therefore, the yaw rate sensor 1 accurately detects the level of the angular velocity.

When an acceleration is applied along the axis perpendicular to each axis, the Coriolis forces Fc applied to the masses 21, which are the detecting parts, are in the same direction. Accordingly, the difference of the output signals from the detection electrode films 24a–24d corresponding to the masses 21 which are opposite to one another is zero and the output signals due to the acceleration are cancelled.

In the present embodiment, the vibration ring 15, the masses 21 and the ring support plate 11 are punched from a stainless plate and are connected from the beginning. This simplifies the assembly and increases the efficiency of manufacturing.

The PZT film 18 is formed by the water-heat method. Accordingly, the PZT film of the vibrating portions 16 and the PZT film 18 of the second coupling portions 22 for detection are formed in one process, and the quality such as detection sensitivity of the yaw rate sensor is maintained at a certain level. Since the PZT film 18 for drive and the PZT film 18 for detection are formed by the water-heat method at the same time, manufacturing time is reduced compared to forming the PZT films 18 for drive and detection independently.

What is claimed is:

1. A two-axis yaw rate sensor comprising:

a ring-shaped member;

wherein the ring-shaped member includes first to fourth vibrating drive surfaces located in order in a circumferential direction and support parts located between the adjacent drive surfaces, wherein the first and the third drive surfaces are opposed to one another on a first axis passing through the center oft he ring-shaped member, the second and the fourth drive surfaces, are opposed to one another on a second axis passing through the center of the ring-shaped member, the second axis being substantially perpendicular to the first axis;

a support member for supporting the ring-shaped member at each support part;

a piezoelectric member, which is located on each drive surface and vibrates the corresponding drive surface in a radial direction of the ring-shaped member;

a coupling portion extending from each drive surface;

a weight, which is coupled to each coupling portion and moves in a direction substantially perpendicular to the vibrating direction of the drive surfaces wherein each weight is located in a middle portion of the corresponding drive surface and extends radially outward relative to the center of the ring-shaped member; and a deformation detection member formed on each coupling portion for detecting the deformation of the corresponding coupling portion.

2. The two-axis yaw rate sensor according to claim 1, wherein the ring-shaped member and the weight are formed of a common metal plate.

3. The two-axis yaw rate sensor according to claim 2, wherein the support member is integrally coupled to the support part and is formed of the same metal plate as the ring-shaped member.

4. The two-axis yaw rate sensor according to claim 3, wherein the support member is substantially cross-shaped.

5. The two-axis yaw rate sensor according to claim 1, wherein the drive surfaces are formed on a peripheral surface of the ring-shaped member.

6. The two-axis yaw rate sensor according to claim 1, wherein the piezoelectric member includes a PZT film.

* * * * *